(12) United States Patent
Matsui

(10) Patent No.: US 8,659,624 B2
(45) Date of Patent: Feb. 25, 2014

(54) MIXED REALITY PRESENTATION SYSTEM AND BRIGHTNESS ADJUSTMENT METHOD OF VIRTUAL LIGHT SOURCE

(75) Inventor: Taichi Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 12/580,430

(22) Filed: Oct. 16, 2009

(65) Prior Publication Data

US 2010/0134495 A1 Jun. 3, 2010

(30) Foreign Application Priority Data

Nov. 28, 2008 (JP) ................... 2008-305623

(51) Int. Cl.
*G09G 5/00* (2006.01)
*G09G 5/02* (2006.01)
(52) U.S. Cl.
USPC .......................................... 345/633; 345/589
(58) Field of Classification Search
None
See application file for complete search history.

(56) References Cited

U.S. PATENT DOCUMENTS

| | | | | |
|---|---|---|---|---|
| 6,219,063 B1 * | 4/2001 | Bouguet et al. | ............... | 345/426 |
| 6,342,887 B1 * | 1/2002 | Munroe | ....................... | 345/426 |
| 7,301,547 B2 * | 11/2007 | Martins et al. | ................ | 345/633 |
| 7,965,304 B2 * | 6/2011 | Sakagawa et al. | ............ | 345/633 |
| 2003/0038822 A1 * | 2/2003 | Raskar | ......................... | 345/632 |
| 2007/0285422 A1 * | 12/2007 | Nayar et al. | .................. | 345/426 |
| 2008/0024523 A1 * | 1/2008 | Tomite et al. | ................. | 345/632 |

FOREIGN PATENT DOCUMENTS

| | | |
|---|---|---|
| JP | 2004-070669 A | 3/2004 |
| JP | 2007-018173 A | 1/2007 |

* cited by examiner

*Primary Examiner* — Ryan R Yang
(74) *Attorney, Agent, or Firm* — Fitzpatrick, Cella, Harper & Scinto

(57) ABSTRACT

Based on an observer's position and observing direction measured in the real world and positions of a virtual light source and virtual object in a virtual world, a brightness adjustment value of the virtual light source is adjusted in a way that, when light from the virtual light source is blocked by an observer, brightness of the virtual object observed by the observer is reduced as if the observer were observing in the real world. As a result, a mixed reality presentation system that achieves a sense of reality is provided.

21 Claims, 11 Drawing Sheets

F I G. 7
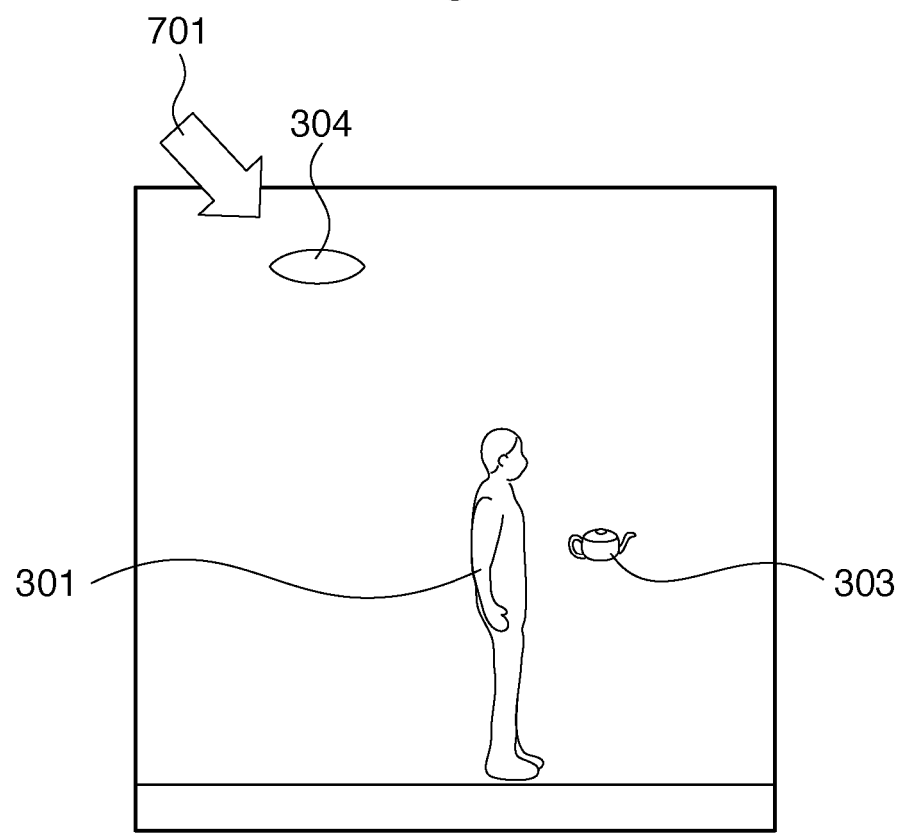

MIXED REALITY PRESENTATION SYSTEM AND BRIGHTNESS ADJUSTMENT METHOD OF VIRTUAL LIGHT SOURCE

BACKGROUND OF THE INVENTION

1. Field of the Invention

The present invention relates to a mixed reality presentation system and a brightness adjustment method of a virtual light source.

2. Description of the Related Art

Recently, systems applying a technique of mixed reality (MR), which naturally combines the real world with a virtual world without giving a sense of oddness, have increasingly been proposed. These MR systems synthesize object images of the real world which are photographed by an image sensing apparatus, for example, a camera, with images of a virtual world which are drawn by computer graphics (CG). By displaying the synthesized image on a display device such as a head-mounted display (hereinafter referred to as a HMD), the MR systems present mixed reality to MR system users.

These mixed reality presentation systems need to generate a virtual world image while tracking changes in the real world image so as to enhance the sense of mixed reality. For this, the mixed reality presentation systems must acquire in real time the system user's view point and attitude, and display in real time images on a display unit, for example, a HMD, for the user.

Note that the mixed reality presentation systems set the user's view point and attitude, which are measured by a sensor unit, as the virtual view point and attitude in the virtual world. Based on the setting, the mixed reality presentation systems draw a virtual world image using CG, and synthesize the virtual world image with the real world image.

Meanwhile, the HMD presents a sense of mixed reality. For this, the MR system performs image displaying within the user's field of vision using the display unit of the HMD, and the display unit of the HMD includes a CG drawing region. By virtue of this configuration, the MR system user can observe, through the display unit of the HMD, an image which looks as if a virtual object existed in the real world. Moreover, in the world of mixed reality, the MR systems can superimpose virtual CG on a real object. The superimposition enables a user to feel a real object which has an appearance of virtual CG.

In the world of mixed reality so far, objects of the real world have not given any influences on the illumination set in the virtual world. In the real world, if a real object blocks actual illumination, the real object creates a shadow. However, the shadow of the real object is not displayed in virtual CG unless particular processing is performed on the illumination of the virtual world. If the shadow is to be displayed, the processing becomes extremely complicated.

The present invention provide simple and high-speed processing of illumination in a virtual world so as to reflect influences of real objects, for example, shadows, in the virtual world.

SUMMARY OF THE INVENTION

In order to solve the above-described problem, a mixed reality presentation system according to the present invention comprises: an image sensing unit configured to sense an object of a real world; a unit of measuring positions and directions configured to measure an image sensing position and an image sensing direction of the image sensing unit; a virtual image generator configured to draw a virtual object illuminated by light from a virtual light source and generate a virtual image; a calculation unit of light effect configured to calculate an adjustment value of brightness of the virtual light source using the position and image sensing direction of the image sensing unit, a position of the virtual light source, and a position of the virtual object measured by the unit of measuring positions and directions; an adjustment unit configured to adjust brightness of the virtual light source in the virtual image generator using the adjustment value of brightness calculated by the calculation unit of light effect; and an image synthesizer configured to synthesize the sensed object image of the real world with the virtual image generated by the virtual image generator.

By virtue of the present invention, a user of the mixed reality presentation system can experience, in a mixed reality world, virtual light in the similar manner to light in the real world.

Further features of the present invention will become apparent from the following description of exemplary embodiments (with reference to the attached drawings).

BRIEF DESCRIPTION OF THE DRAWINGS

FIG. 7 is a view showing a configuration of a mixed reality world including a virtual light source according to the third embodiment;

DESCRIPTION OF THE EMBODIMENTS

Preferred embodiments of the present invention will now be described in detail in accordance with the accompanying drawings.

First Embodiment

According to a configuration of the first embodiment, the mixed reality presentation system includes single virtual illumination, two virtual objects, and one observer. Herein, the observer can view virtual objects A and B.

First, the system configuration is described.

Figure 1:
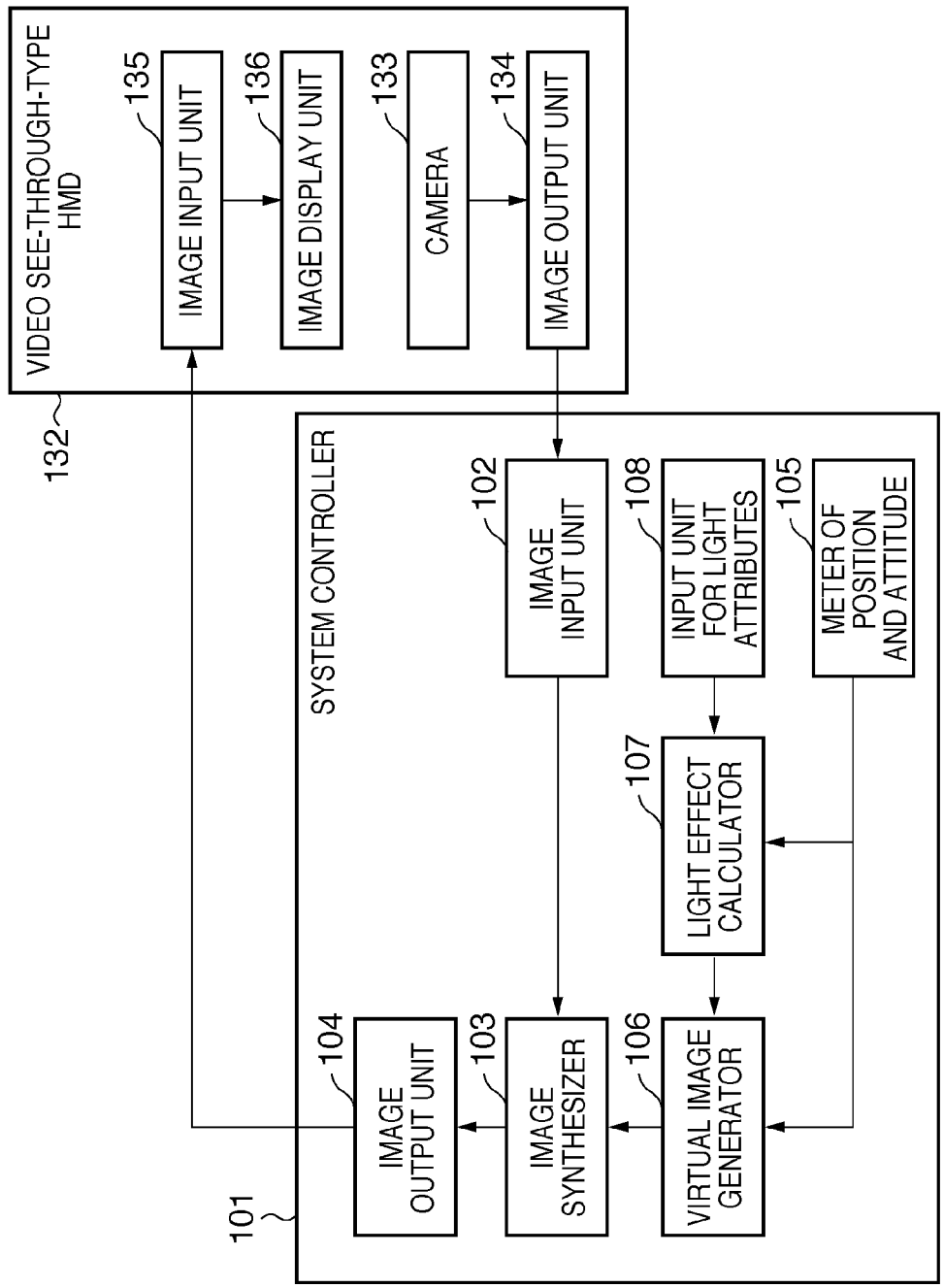
FIG. 1 is a diagram showing as an example a configuration of a mixed reality presentation system according to the present invention.

FIG. 1 shows an example of a system configuration according to the first embodiment. Each of the components is now described in brief. A system controller 101, which controls the entire system, comprises an image input unit 102, an image synthesizer 103, an image output unit 104, a meter of camera's position and attitude 105, a virtual image generator 106, a light effect calculator 107, and an input unit for light attributes 108.

A video see-through-type head mounted display (HMD) 132 comprises a camera 133, an image output unit 134, an image input unit 135, and an image display unit 136. Next described is the operation flow of each constituent unit of the configuration shown in FIG. 1.

Figure 2:
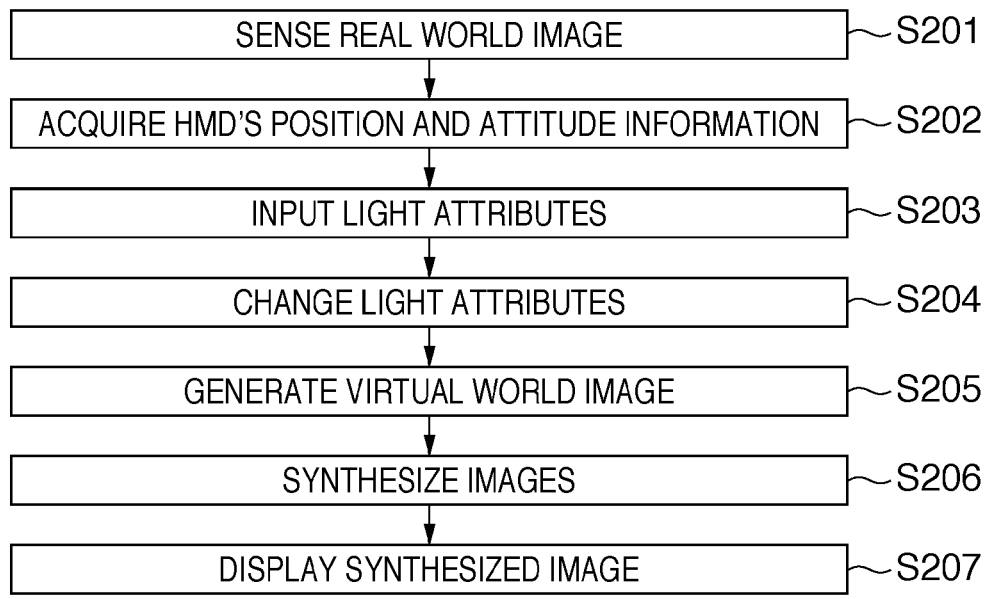
FIG. 2 is a flowchart describing an operation according to the first embodiment.

FIG. 2 is a flowchart describing an operation of each constituent unit.

Step 201: The camera 133 of the HMD 132 mounted to an observer's head senses an object in the real space. The sensed image of the real space is transmitted to the image output unit 134. The image output unit 134 transmits the object's image of the real space to the image input unit 102 of the system controller 101. In the system controller 101, the image data of the real space inputted to the image input unit 102 is transmitted to the image synthesizer 103.

Step 202: The meter of camera's position and attitude 105 measures the position and image sensing direction (attitude) of the camera 133, and transmits the information regarding the position and direction to the virtual image generator 106. As for the position and direction measuring method, the position and attitude of the camera 133 can be measured by a three-dimensional position/attitude measuring system, for example, Fastrak manufactured by POLHEMUS. In this system, any means may be used.

Step 203: The input unit for light attributes 108 inputs light attributes to the light effect calculator 107.

Step 204: The light effect calculator 107 changes attributes of virtual illumination as necessary based on the light attribute inputs and position information from the meter of camera's position and attitude 105. How the attributes are changed is the important part of the present invention, and it will be described later with reference to FIG. 7.

Step 205: The virtual image generator 106 draws an image of the virtual world and generates a virtual image based on the virtual illumination attributes changed by the light effect calculator 107 and the position information from the meter of camera's position and attitude 105.

Step 206: The image synthesizer 103 synthesizes the real world image from the image input unit with the virtual world image from the virtual image generator 106, and transmits the synthesized image to the image output unit 104.

Step 207: The image output unit 104 transmits the synthesized image to the image input unit 135 of the HMD 132. The image display unit 136 displays the synthesized image.

As a result, an observer can observe an image of the mixed reality world in which virtual illumination exists.

Figure 3:
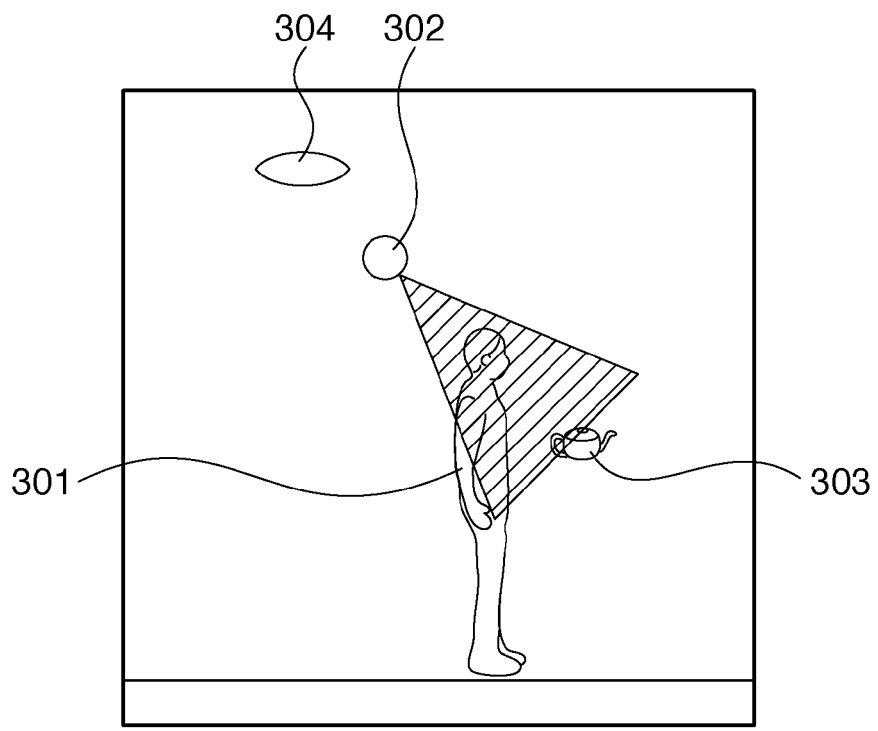
FIG. 3 is a view showing a configuration of a mixed reality world including a virtual light source according to the first embodiment.

FIG. 3 is an explanatory view of the mixed reality world according to the first embodiment. In the mixed reality world, there are an observer 301, a light source at virtual point 302, a virtual object A 303, and a virtual object B 304.

Coordinates of each point in the real world are shown below.

Observer's view point (camera position) 301: (0, 0, 0)
Light source at virtual point 302: (−500, 500, 0)
Virtual object A 303: (500, −500, 0)
Virtual object B 304: (−1000, 1000, 0)

Assume that brightness of the light source at virtual point 302 is 0.8.

As can be seen from FIG. 3, the observer 301 is observing the virtual object A 303. The light source at virtual point 302 is illuminating the virtual object A 303.

The observer 301 in the real world is blocking the light beam which is illuminating the virtual object A 303 from the light source at virtual point 302. To reproduce this circumstance in the mixed reality world, the light source at virtual point 302 needs to be adjusted.

For adjusting the light source at virtual point, brightness of the point source of light is adjusted in the first embodiment. Parameters for the adjustment are shown below.

Position of light source at virtual point: P11
Position of the observer's view point: P12
Position of virtual object A: P13

Vectors are calculated based on these positions.

Direction vector of observer's observing direction: V12
Direction vector from the light source at virtual point to the observer: V11

$$V11 = P12 - P11$$

$$V12 = P13 - P12$$

Assume that the unit vector of V11 is e11, and the unit vector of V12 is e12.

Assuming that a coefficient is k and a brightness reduction rate of the light source at virtual point is t1, t1 is expressed in the following equation in which the inner product of two unit vectors is multiplied by k.

$$t1 = k(e11 \cdot e12)$$

Assuming that k=0.5, the above values are inserted.

$$e11 = (1, -1, 0)$$

$$e12 = (1, -1, 0)$$

As a result, t1=0.5 1=0.5 is obtained.

Therefore, since the brightness of the light source at virtual point 302 is 0.8, the adjustment value of the brightness which has been reduced when the light source at virtual point was blocked by the observer is calculated to be 0.8 0.5=0.4, using the reduction rate t1.

Figure 4:
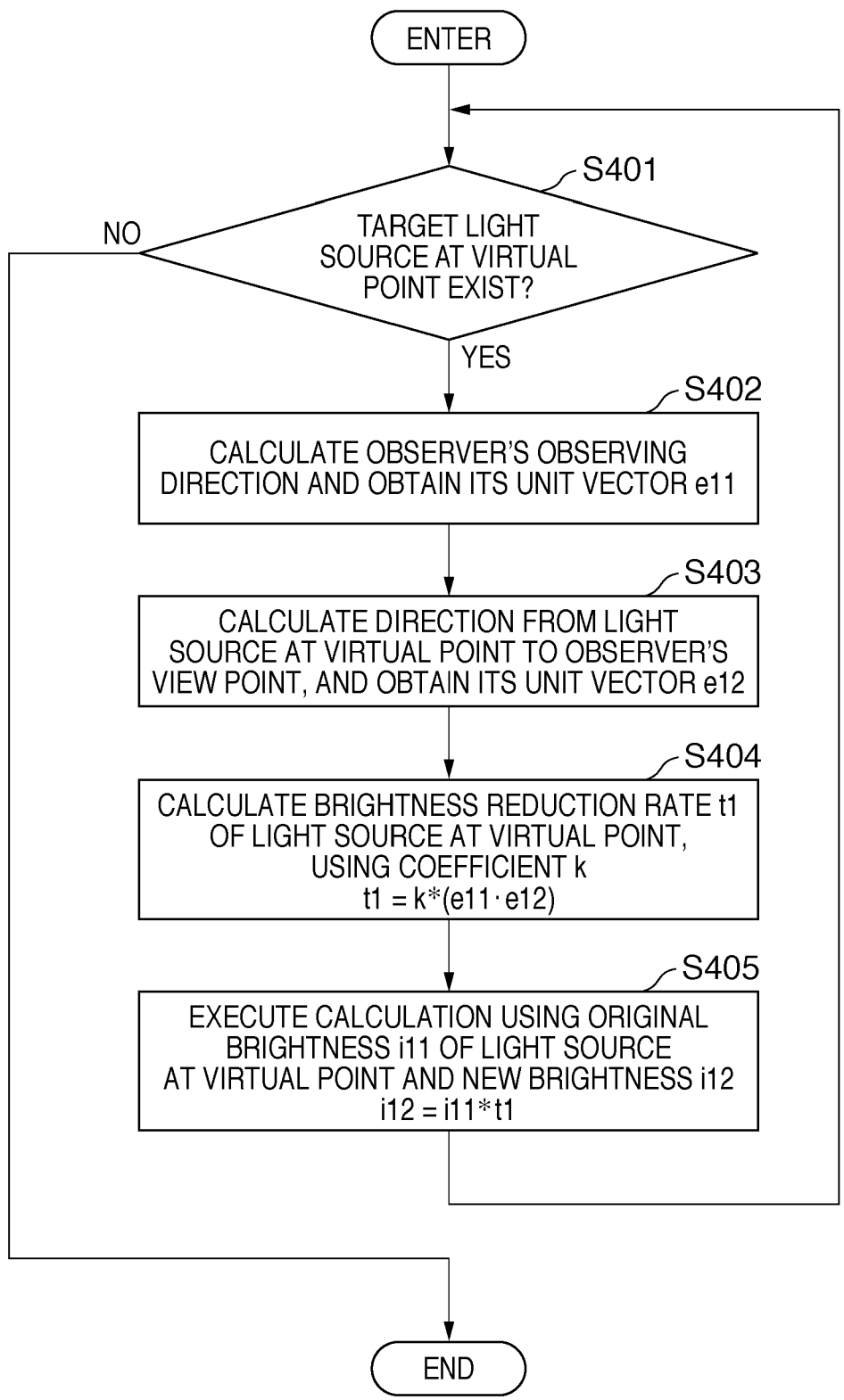
FIG. 4 is a flowchart describing calculation of a brightness reduction rate according to the first embodiment.

FIG. 4 is a flowchart describing the calculation flow of the reduction rate.

Step 401: The light effect calculator 107 of the system controller 101 confirms whether or not there is a light source at virtual point which has been inputted in the input unit for light attributes 108. If there is a light source at virtual point, the control proceeds to step 402; otherwise, the control ends.

Step 402: The light effect calculator 107 calculates an observer's observing direction, and acquires its unit vector as e12.

Step 403: The light effect calculator 107 calculates the direction from the light source at virtual point to the observer, and acquires its unit vector as e11.

Step 404: The light effect calculator 107 calculates the brightness reduction rate t1 of the light source at virtual point, using the coefficient k=0.5

$$t1 = k(e11 \cdot e12)$$

Step 405: The light effect calculator 107 executes calculation, defining that the original brightness of the light source at virtual point is i11 and the new reduced brightness is i12.

$$i12 = i11 t1$$

Then, the calculation ends.

As described above, in the first embodiment, the virtual light source is blocked by an observer. In this case, to give the observer a sense of mixed reality, the first embodiment provides a technique in which the original brightness of the light source at virtual point is darkened and synthesized. It is apparent in this case that the brightness of the light source at virtual point which is blocked by an observer is half the original brightness of the light source at virtual point.

Second Embodiment

The system configuration of the second embodiment is similar to that of the first embodiment.

Figure 5:
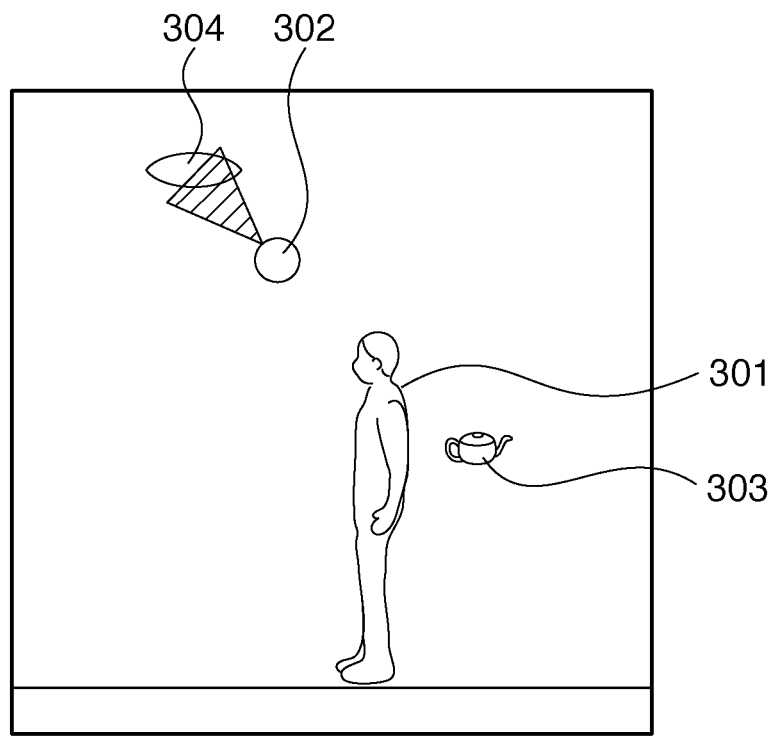
FIG. 5 is a view showing a configuration of a mixed reality world including a virtual light source according to the second embodiment.

FIG. 5 shows objects and their arrangement in a mixed reality world according to the second embodiment. The position of each object is the same as that of the first embodiment.

However, the observing direction of the observer 301 is different from that of the first embodiment. In the second embodiment, the observer 301 is observing a virtual object B 304.

Coordinates of each point in the mixed reality world are shown below.

Observer 301: (0, 0, 0)
Light source at virtual point 302: (−500, 500, 0)
Virtual object A 303: (500, −500, 0)
Virtual object B 304: (−1000, 1000, 0)

Assume that brightness of the light source at virtual point 302 is 0.8.

The observer 301 is observing the virtual object B 304. The light source at virtual point 302 is illuminating the virtual object B 304.

As can be seen from FIG. 5, unlike the first embodiment, the observer 301 is not preventing the light source at virtual point 302 from illuminating the virtual object B304.

However, in the first and second embodiments, the position of the light source at virtual point, the position of the observer, and the position of the virtual object are the same. On the other hand, the observer's observing direction is different. In this case, the following equation which has been used in the first embodiment is also employed to obtain the brightness reduction rate of the point source of light.

$$t1=k(e11 \cdot e12)$$

This equation is applied to the second embodiment. Assuming that k=0.5 stands as similar to the first embodiment, the following calculation is obtained.

$$t1=0.5(-1)=-0.5$$

The calculated value t1 being minus is interpreted mathematically as the implication of simply raising the brightness; however, this is not correct given the circumstance of the second embodiment. In other words, not changing the brightness is correct in this case. For a physical interpretation, the brightness of the light source at virtual point is reduced only when the inner product (e11·e12) is a positive value. When the inner product value is 0, the vector of the observer's observing direction and the vector from the point source of light to the observer form 90°. In other words, the following rule is adopted, that is, the brightness of the light source at virtual point is reduced only when the observer's observing direction and the direction from the point source of light to the observer is equal to or less than 90°.

Figure 6:
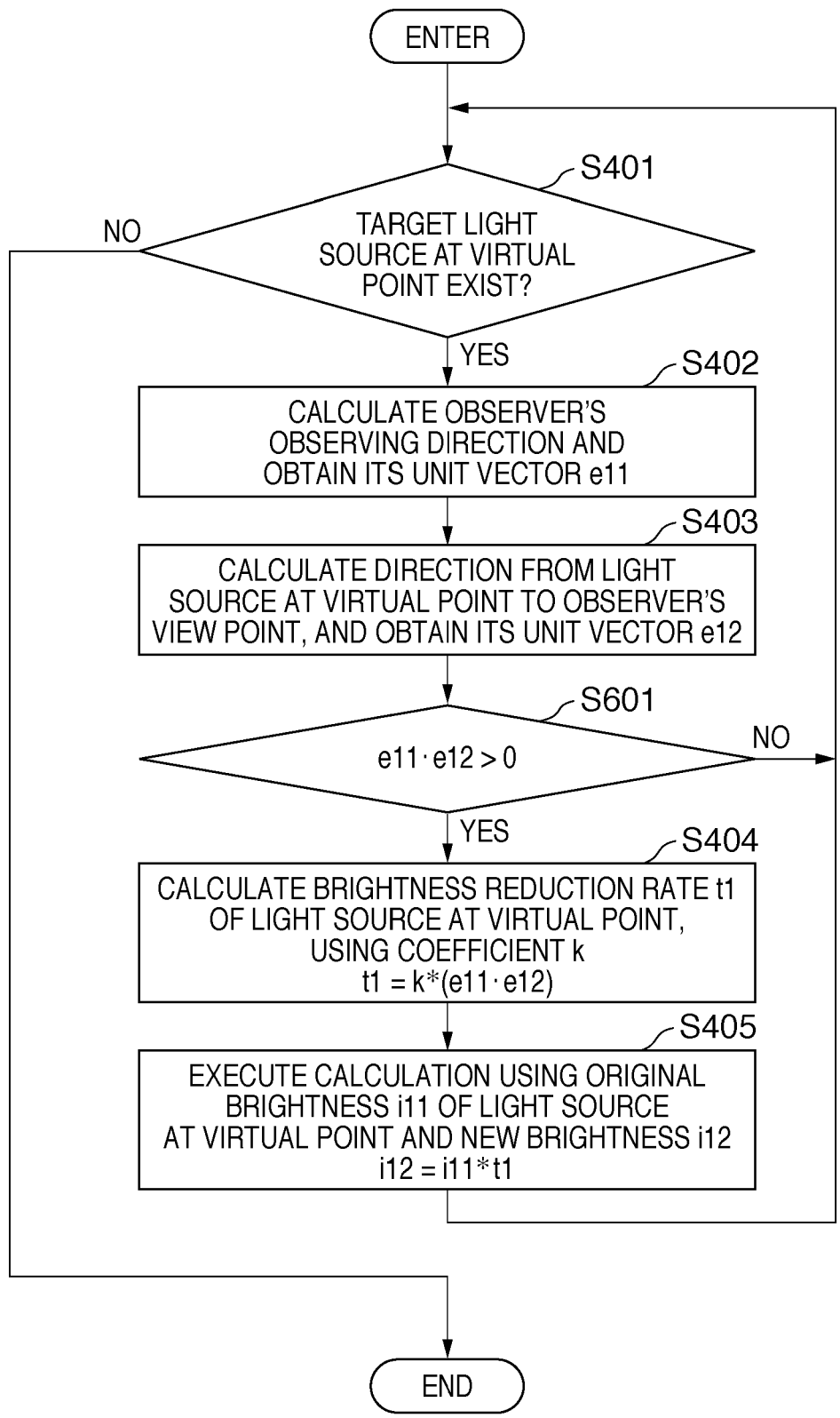
FIG. 6 is a flowchart describing calculation of a brightness reduction rate according to the second embodiment.

FIG. 6 is a flowchart describing the calculation flow of the reduction rate according to the second embodiment. This flowchart differs from FIG. 4 in that step 601 is inserted between the processing of step 403 and the processing of step 404. Therefore, descriptions of the steps other than step 601 are omitted.

Step 601: The light effect calculator 107 calculates the inner product (e11·e12). When the inner product is a positive value, the control proceeds to step 404. When the inner product is a negative value, the control returns to step 401.

As has been set forth above, the second embodiment has described that, if an observer is not blocking the virtual light source, in other words, when the observer is facing the virtual light source direction, reducing the brightness of the virtual light source is not necessary in the virtual reality world. Also the second embodiment has shown that, in this case, the inner product (e11·e12) becomes a negative value. In the above-described manner, a predetermined threshold value can be set (in this case, "a positive value" is set) for an inner product value, and the system can be so controlled that the virtual light source is not reduced if the inner product value does not fall within the threshold value.

Third Embodiment

Virtual parallel light has no particular position and penetrates all virtual objects. In the real world, parallel light always exists. For instance, the sun is the parallel light in the real world. When an observer is between the sun and an observation object, naturally the observation object is shadowed. The third embodiment realizes a mixed reality world where parallel light such as the sun exists in the virtual world.

The third embodiment has the similar system configuration as that of the first embodiment.

FIG. 7 shows objects' arrangement in a mixed reality world according to the third embodiment.

In the third embodiment, there are an observer 301, virtual parallel light 701, a virtual object A 303, and a virtual object B 304.

Coordinates of each point in the mixed reality world are shown below.

Observer 301: (0, 0, 0)
Virtual object A 303: (500, −500, 0)
Virtual object B 304: (−1000, 1000, 0)

The vector of the virtual parallel light is shown below.

Virtual parallel light 701: (1, −1, 0)

Assume that brightness of the virtual parallel light 701 is 0.8.

Since the observer 301 is observing the virtual object A 303, the vector indicative of the observing direction is (1, −1, 0). The virtual parallel light 701 is irradiating light beams from behind the observer 301. When the observer 301 and the virtual object A 303 hold the positional relation shown in FIG. 7, the virtual parallel light 701 is blocked. To get a similar sense to that of the real world, the virtual parallel light 701 needs to be adjusted.

For an adjustment method of virtual parallel light, brightness of the virtual parallel light is adjusted in the third embodiment. Parameters for the adjustment are shown below.

Direction vector of virtual parallel light: V31
Observer's view point position: P32
Position of virtual object A: P33

Vectors are calculated from these positions.

Direction vector of the observer's observing direction: V32

$$V32=P33-P32$$

Assume that the unit vector of V31 is e31, and the unit vector of V32 is e32.

Assuming that the coefficient is k and a brightness reduction rate of the virtual parallel light is t3, t3 is expressed in the following equation.

$$t3=k(e31 \cdot e32)$$

Assuming that k=0.5, the above values are inserted.

$$e31=(1,-1,0)$$

$$e32=(1,-1,0)$$

As a result, t3=0.5 1=0.5 is obtained.

Since the brightness of the virtual parallel light 701 is 0.8, the new brightness of the virtual parallel light illuminating the observation object is 0.8 0.5=0.4.

Figure 8:
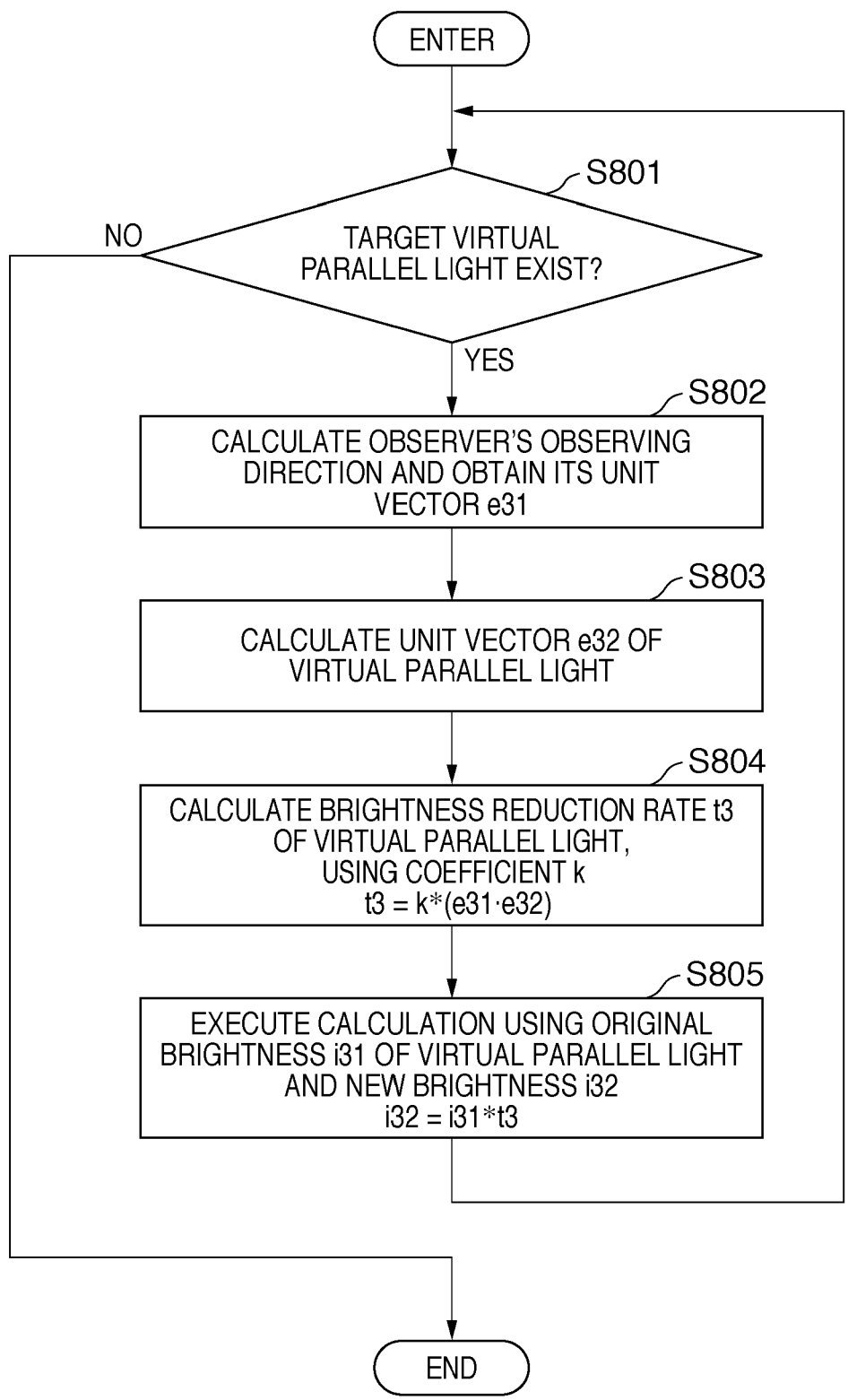
FIG. 8 is a flowchart describing calculation of a brightness reduction rate according to the third embodiment.

FIG. 8 is a flowchart describing the calculation flow of the reduction rate according to the third embodiment.

Step 801: The light effect calculator 107 of the system controller 101 confirms whether or not there is virtual parallel light which has been inputted in the input unit for light attributes 108. If there is a virtual parallel light, the control proceeds to step 802; otherwise, the control ends.

Step 802: The light effect calculator 107 calculates an observer's observing direction, and acquires its unit vector as e31.

Step 803: The light effect calculator 107 calculates the direction from the virtual parallel light to the observer, and acquires its unit vector as e32.

Step 804: The light effect calculator 107 calculates the brightness reduction rate t3 of the virtual parallel light by the following equation, using the coefficient k=0.5.

$$t3=k(e31 \cdot e32)$$

Step 805: The light effect calculator 107 executes calculation, using the original brightness of the virtual parallel light i31 and the new brightness i32.

$$i32=i31t1$$

Then, the calculation ends.

In the above-described manner, according to the third embodiment, virtual parallel light can also be synthesized in a mixed reality world, as similar to the first embodiment.

As set forth above, in a case where virtual parallel light is blocked by an observer as similar to the first embodiment, the third embodiment provides a technique in which the original brightness of the virtual parallel light is darkened and synthesized. It is apparent in this case that the brightness of the virtual parallel light, when it is blocked by an observer, is half the original brightness of the virtual parallel light.

Fourth Embodiment

The system configuration of the fourth embodiment is similar to that of the first embodiment.

Figure 9:
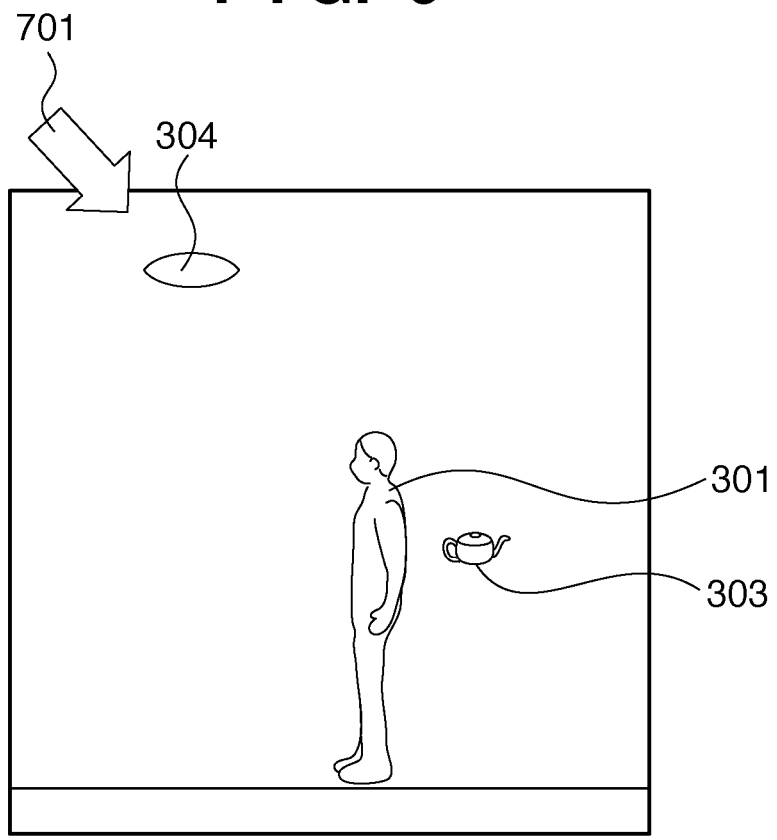
FIG. 9 is a view showing a configuration of a mixed reality world including a virtual light source according to the fourth embodiment.

FIG. 9 shows objects and their positions in a mixed reality world according to the fourth embodiment. The positions of the observer and virtual objects are the same as that of the third embodiment.

However, the observing direction of the observer 301 is different from that of the third embodiment. In the fourth embodiment, the observer 301 is observing the virtual object B 304.

Coordinates of each point in the mixed reality world are shown below.

Observer 301: (0, 0, 0)
Virtual object A 303: (500, −500, 0)
Virtual object B 304: (−1000, 1000, 0)
The vector of virtual parallel light is shown below.
Virtual parallel light 701: (1, −1, 0)
The brightness of the virtual parallel light 701 is 0.8, as similar to the third embodiment.

Since the observer 301 is observing the virtual object B 304, the vector indicative of the observing direction is (−1, 1, 0). The virtual parallel light 701 is irradiating light beams from the front side of the observer 301. When the observer 301 and the virtual object B 304 hold the positional relation shown in FIG. 9, it is possible to say that, in order to get a sense similar to that of the real world, there is no need to adjust the virtual parallel light 701. In other words, the virtual parallel light is not blocked by the observer. Therefore, it is possible to assume that the fourth embodiment obtains the same result as the case of the second embodiment.

The equation for calculating a brightness reduction rate of the virtual parallel light, which has been described in the second embodiment, is shown below.

$$t1=k(e11 \cdot e12)$$

This equation is applied to the fourth embodiment.

Assuming that k=0.5 stands as similar to the first embodiment, the following calculation is obtained.

$$t1=0.5(-1)=-0.5$$

The calculated value t1 being minus is interpreted mathematically as the implication of simply raising the brightness; however, it is not correct given the circumstance of the fourth embodiment. In other words, not changing the brightness is correct in this case. For a physical interpretation, the brightness of the virtual parallel light is reduced only when the inner product (e11·e12) is a positive value. When the inner product value is 0, the vector of the observer's observing direction and the vector from the point source of light to the observer form 90°. In other words, the following rule is adopted, that is, the brightness of the virtual parallel light is reduced only when the observer's observing direction and the direction from the point source of light to the observer is equal to or less than 90°, as similar to the first and third embodiments.

Figure 10:
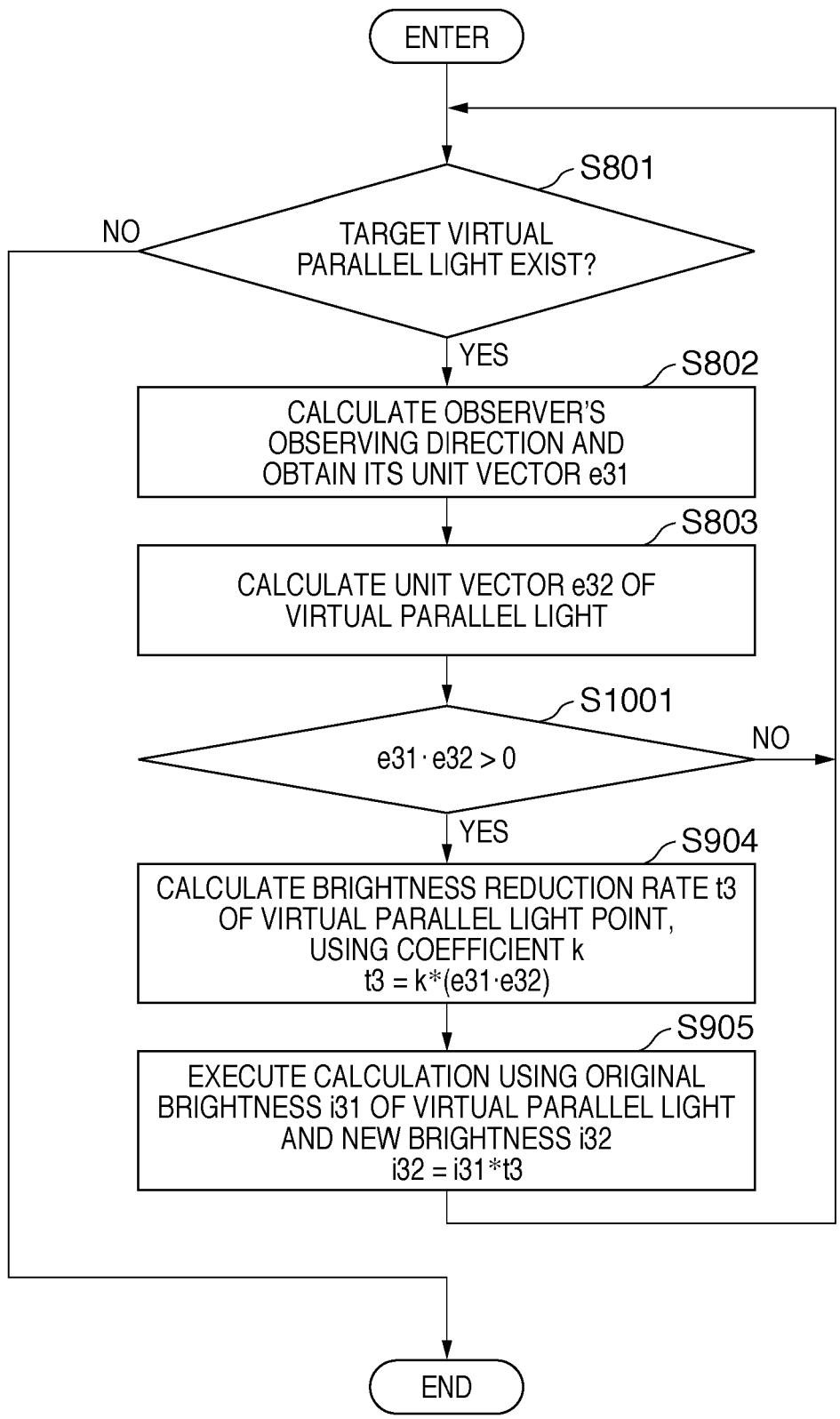
FIG. 10 is a flowchart describing calculation of a brightness reduction rate according to the fourth embodiment.

FIG. 10 is a flowchart describing the calculation according to the fourth embodiment.

This flowchart differs from FIG. 8 in that step 1001 is inserted between the processing of step 803 and the processing of step 804. Therefore, descriptions of the steps other than step 1001 are omitted.

Step 1001: The light effect calculator 107 calculates the inner product (e31·e32). When the inner product is a positive value, the control proceeds to step 904. When the inner product is a negative value, the control returns to step 801.

As has been set forth above, the fourth embodiment has described that, if an observer is not blocking the virtual parallel light, in other words, when the observer is facing the virtual parallel light direction, reducing the brightness of the virtual parallel light is not necessary in the virtual reality world. Also the fourth embodiment has shown that, in this case, the inner product (e11·e12) becomes a negative value.

Fifth Embodiment

Figure 11:
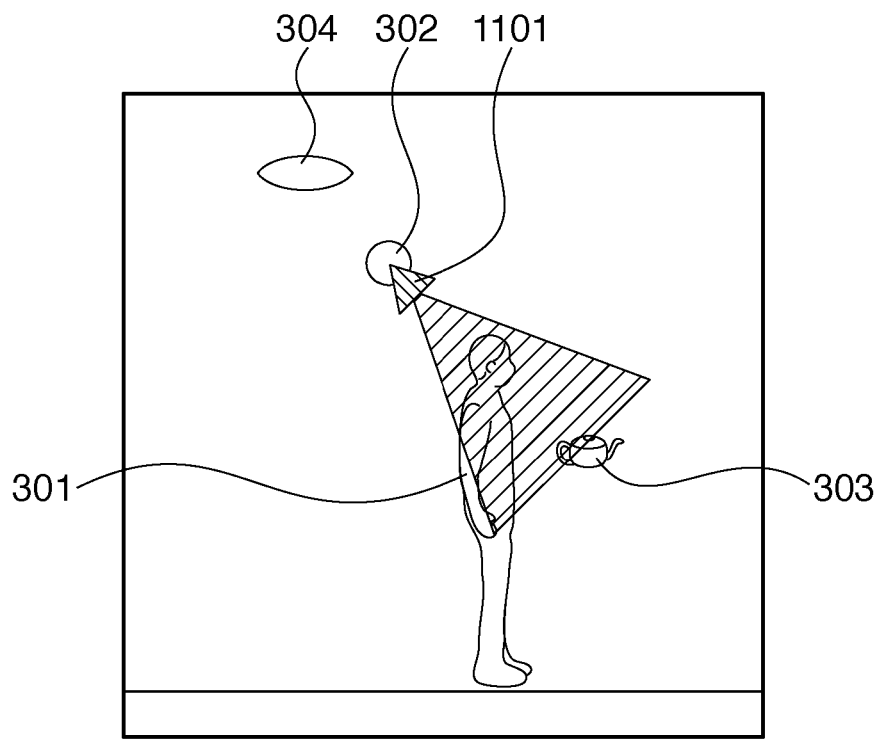
FIG. 11 is a view showing a configuration of a mixed reality world including a virtual light source according to the fifth embodiment.

FIG. 11 shows objects and their arrangement according to the fifth embodiment.

As can be seen from FIG. 11, the configuration is the same as that of the first embodiment except that a virtual illumination light source 1101 is added.

Attributes of the virtual illumination light source 1101, namely, the position and direction, are shown below.

Position (−500, 500, 0)
Illuminating direction (1, −1, 0)
The virtual illumination light source 1101 is provided for adjusting the brightness of the light source at virtual point 302. Therefore, the virtual illumination light source 1101, which exists in the same position as that of the light source at the virtual point 302, is so set to be directed to the observer 301.

If the virtual illumination light source 1101 is excluded, the configuration is the same as that of the first embodiment. According to the fifth embodiment, the light source at virtual point is adjusted using the virtual illumination light source 1101 without changing the attributes of the light source at virtual point 302.

The virtual illumination light source 1101 serves to reduce the brightness of the scene. In the first embodiment, the reduction rate t1 has been calculated. Assuming that the brightness of the light source at virtual point 302 is i11, the level of the reduced brightness of the virtual illumination light source 1101 is defined by i4=i11 t1.

By virtue of the virtual illumination light source, the virtual object A 303 which is observed by the observer 301 is darkened, and as a result, the observer can experience light of the mixed reality world in the similar manner to that of the real world.

Figure 12:
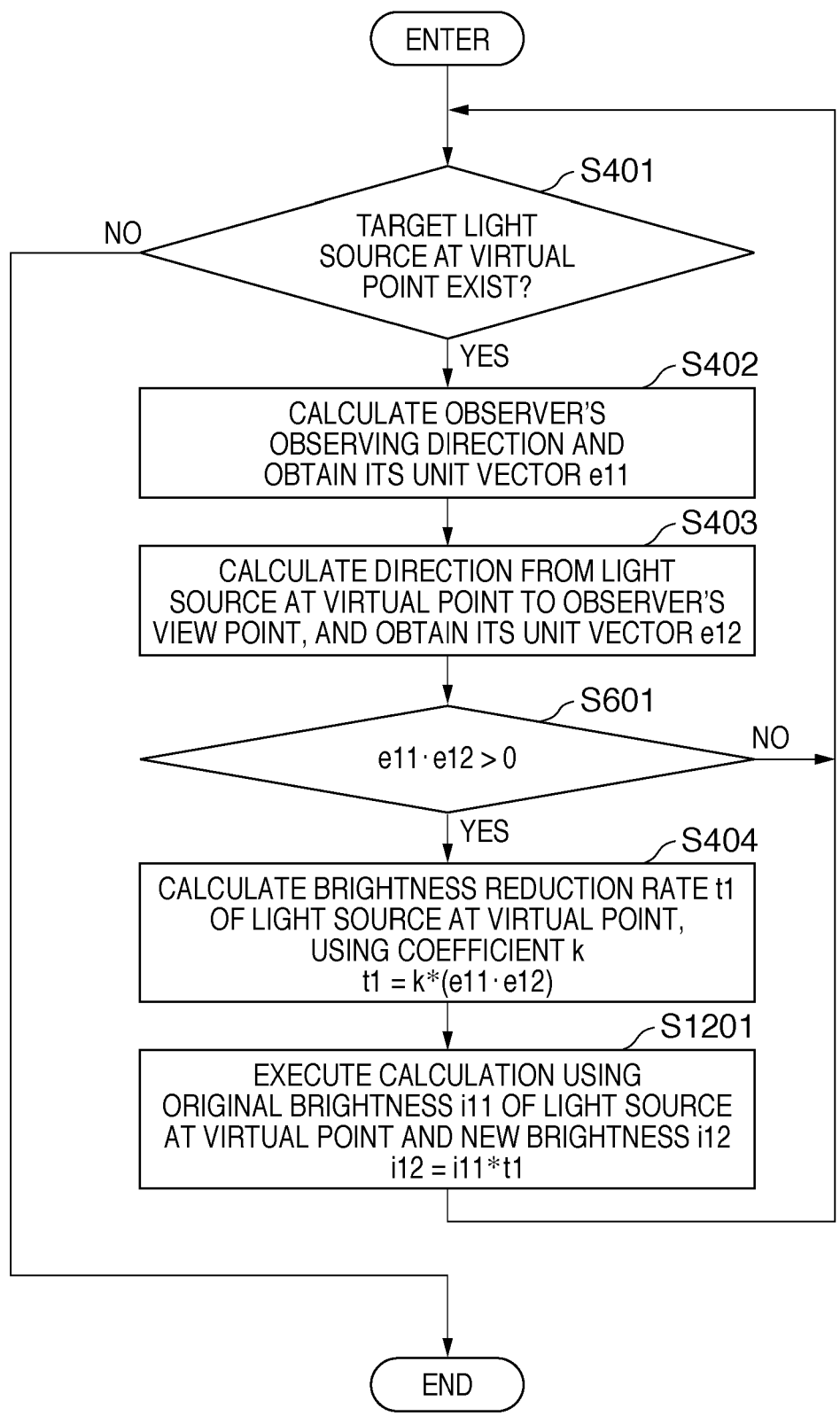
FIG. 12 is a flowchart describing calculation of a brightness reduction rate according to the fifth embodiment.

FIG. 12 is a flowchart describing the calculation according to the fifth embodiment.

FIG. 12 shows a flowchart, in which step 405 in FIG. 6 according to the second embodiment is changed to step 1201. Therefore, descriptions of the steps other than step 1201 are omitted.

Step 1201: Assuming that the brightness of the light source at virtual point is i11 and the effect achieved by the virtual illumination light is i4, the light effect calculator 107 calculates i4=i11 t1 to obtain the brightness adjustment value.

As has been set forth above, the fifth embodiment achieves the brightness adjusting technique in the mixed reality space, by providing virtual illumination light at the position of the light source at virtual point.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-305623, filed Nov. 28, 2008, which is hereby incorporated by reference herein in its entirety.

What is claimed is:

1. A mixed reality presentation system comprising:
   an image sensing unit configured to sense an object of a real world;
   a measuring unit configured to measure an image sensing position and an image sensing direction of said image sensing unit;
   a virtual image generator configured to draw a virtual object illuminated by light from a virtual light source and generate a virtual image;
   a calculation unit configured to calculate an adjustment value of brightness of the virtual light source using the image sensing position and image sensing direction of said image sensing unit measured by said measuring unit, a position of the virtual light source, and a position of the virtual object;
   an adjustment unit configured to adjust brightness of the virtual light source on the virtual object using the adjustment value calculated by said calculation unit when the image sensing position of said image sensing unit is between the position of the virtual light source and the position of the virtual object; and
   an image synthesizer configured to synthesize the sensed object image of the real world with the virtual image generated by said virtual image generator.

2. The mixed reality presentation system according to claim 1, wherein in a case where the virtual light source is a point source of light, said calculation unit acquires an inner product between a direction vector from the virtual light source to a view point of said image sensing unit and a direction vector from the view point of said image sensing unit to the virtual object, and multiplies a value of the inner product by the brightness of the virtual light source, thereby calculating the adjustment value of brightness of the virtual light source.

3. The mixed reality presentation system according to claim 2, wherein said calculation unit does not adjust brightness of the virtual light source if the value of the inner product does not fall within a predetermined threshold value.

4. The mixed reality presentation system according to claim 1, wherein in a case where the virtual light source is a point source of light, said mixed reality presentation system sets a virtual illumination light source in a same position as the virtual light source so that the light is directed from the virtual light source to a view point of said image sensing unit, and calculates an adjustment value of brightness of the virtual illumination light source by acquiring an inner product between a direction vector from the virtual light source to the view point of said image sensing unit and a direction vector from the view point of said image sensing unit to the virtual object, and multiplying a value of the inner product by the brightness of the virtual light source.

5. A mixed reality presentation system comprising:
   an image sensing unit configured to sense an object of a real world;
   a measuring unit configured to measure an image sensing position and an image sensing direction of said image sensing unit;
   a virtual image generator configured to draw a virtual object illuminated by parallel light from a virtual light source and generate a virtual image;
   a calculation unit configured to calculate an adjustment value of brightness of the virtual light source using the image sensing position and image sensing direction of said image sensing unit measured by said measuring unit, an irradiating direction of the parallel light, and a position of the virtual object;
   an adjustment unit configured to adjust brightness of the virtual light source on the virtual object using the adjustment value of brightness calculated by said calculation unit when the image sensing position of said image sensing unit is between the position of the virtual light source and the position of the virtual object; and
   an image synthesizer configured to synthesize the sensed object image of the real world with the virtual image generated by said virtual image generator.

6. The mixed reality presentation system according to claim 5, wherein said calculation unit acquires an inner product between a direction vector of the parallel light and a direction vector from a view point of said image sensing unit to the virtual object, and multiplies a value of the inner product by the brightness of the virtual light source, thereby calculating the adjustment value of brightness of the virtual light source.

7. The mixed reality presentation system according to claim 6, wherein said calculation unit does not adjust brightness of the virtual light source if the value of the inner product does not fall within a predetermined threshold value.

8. A method of adjusting brightness of a virtual light source in a mixed reality presentation system, comprising the steps of:

sensing an object of a real world with an image sensing unit;

measuring an image sensing position and image sensing direction of the image sensing unit;

drawing a virtual object illuminated by light from a virtual light source and generating a virtual image;

calculating an adjustment value of brightness of the virtual light source using the measured image sensing position and image sensing direction of the image sensing unit, a position of the virtual light source, and a position of the virtual object;

adjusting brightness of the virtual light source on the virtual object using the calculated adjustment value when the image sensing position of the image sensing unit is between the position of the virtual light source and the position of the virtual object; and synthesizing the sensed object image of the real world with the generated virtual image.

9. A mixed reality presentation system comprising:

an image sensing unit configured to sense an object of a real world;

a measuring unit configured to measure an image sensing position and an image sensing direction of said image sensing unit;

a virtual image generator configured to draw a virtual object illuminated by light from a virtual light source and generate a virtual image;

a calculation unit configured to calculate an adjustment value of brightness of the virtual light source using the image sensing position and image sensing direction of said image sensing unit, a position of the virtual light source, and a position of the virtual object measured by said unit of measuring positions and directions;

an adjustment unit configured to adjust brightness of the virtual light source in said virtual image generator using the adjustment value of brightness calculated by said calculation unit; and an image synthesizer configured to synthesize the sensed object image of the real world with the virtual image generated by said virtual image generator, wherein, when the virtual light source is a point source of light, said calculation unit, which calculates an adjustment value of brightness of the virtual light source, acquires an inner product between a direction vector from the virtual light source to a view point of said image sensing unit and a direction vector from the view point of said image sensing unit to the virtual object, and multiplies a value of the inner product by the brightness of the virtual light source, thereby calculating the adjustment value of brightness of the virtual light source.

10. The mixed reality presentation system according to claim 9, wherein said calculation unit, which calculates an adjustment value of brightness of the virtual light source, does not adjust brightness of the virtual light source if the value of the inner product does not fall within a predetermined threshold value.

11. A mixed reality presentation system comprising:

an image sensing unit configured to sense an object of a real world;

a measuring unit configured to measure an image sensing position and an image sensing direction of said image sensing unit;

a virtual image generator configured to draw a virtual object illuminated by parallel light from a virtual light source and generate a virtual image;

a calculation unit configured to calculate an adjustment value of brightness of the virtual light source using the image sensing position and image sensing direction of said image sensing unit, an irradiating direction of the parallel light, and a position of the virtual object measured by said unit of measuring positions and directions;

an adjustment unit configured to adjust brightness of the virtual light source in said virtual image generator using the adjustment value of brightness calculated by said calculation unit; and an image synthesizer configured to synthesize the sensed object image of the real world with the virtual image generated by said virtual image generator, wherein said calculation unit, which calculates an adjustment value of brightness of the virtual light source, acquires an inner product between a direction vector of the parallel light and a direction vector from a view point of said image sensing unit to the virtual object, and multiplies a value of the inner product by the brightness of the virtual light source, thereby calculating the adjustment value of brightness of the virtual light source.

12. The mixed reality presentation system according to claim 11, wherein said calculation unit, which calculates an adjustment value of brightness of the virtual light source, does not adjust brightness of the virtual light source if the value of the inner product does not fall within a predetermined threshold value.

13. The mixed reality presentation system according to claim 12, wherein in a case where the virtual light source is a point source of light, said mixed reality presentation system sets a virtual illumination light source in a same position as the virtual light source so that the light is directed from the virtual light source to a view point of said image sensing unit, and calculates an adjustment value of brightness of the virtual illumination light source by acquiring an inner product between a direction vector from the virtual light source to the view point of said image sensing unit and a direction vector from the view point of said image sensing unit to the virtual object, and multiplying a value of the inner product by the brightness of the virtual light source.

14. A method of adjusting brightness of a virtual light source in a mixed reality presentation system, comprising the steps of:

sensing an object of a real world with an image sensing unit;

measuring an image sensing position and an image sensing direction of the image sensing unit;

drawing a virtual object illuminated by light from a virtual light source and generating a virtual image;

calculating an adjustment value of brightness of the virtual light source using the image sensing position and image sensing direction of the image sensing unit, a position of the virtual light source, and a position of the virtual object measured by a position and direction measuring unit;

adjusting the brightness of the virtual light source using the calculated adjustment value of brightness; and synthesizing the sensed object image of the real world with the generated virtual image, wherein, when the virtual light source is a point source of light, the calculating step acquires an inner product between a direction vector from the virtual light source to a view point of the image sensing unit and a direction vector from the view point of the image sensing unit to the virtual object, and multiplies a value of the inner product by the brightness of the virtual light source, thereby calculating the adjustment value of brightness of the virtual light source.

15. A method of adjusting brightness of a virtual light source in a mixed reality presentation system, comprising the steps of:
- sensing an object of a real world with an image sensing unit;
- measuring an image sensing position and an image sensing direction of the image sensing unit;
- drawing a virtual object illuminated by parallel light from a virtual light source and generating a virtual image;
- calculating an adjustment value of brightness of the virtual light source using the image sensing position and image sensing direction of the image sensing unit, an irradiating direction of the parallel light, and a position of the virtual object measured by a position and direction measuring unit;
- adjusting brightness of the virtual light source in said virtual image generator using the calculated adjustment value of brightness; and
- synthesizing the sensed object image of the real world with the generated virtual image,
- wherein the calculating step acquires an inner product between a direction vector of the parallel light and a direction vector from a view point of the image sensing unit to the virtual object, and multiplies a value of the inner product by the brightness of the virtual light source, thereby calculating the adjustment value of brightness of the virtual light source.

16. A mixed reality presentation system comprising:
- an image sensing unit configured to sense a real world;
- a measuring unit configured to measure an image sensing position of said image sensing unit;
- a virtual image obtaining unit configured to obtain a virtual object illuminated by light from a virtual light source;
- an adjustment unit configured to adjust brightness of the virtual object in a case where the image sensing position of said image sensing unit is between the position of the virtual light source and the position of the virtual object; and
- a display unit configured to display a virtual object obtained by said virtual object obtaining unit.

17. The system according to claim 16, further comprising a calculation unit configured to calculate an adjustment value for brightness of the virtual light source using the image sensing position, a position of the virtual light source, and a position of the virtual object,
- wherein the adjustment unit adjusts brightness of the virtual object using the adjustment value calculated by said calculation unit.

18. The system according to claim 16, wherein at least one the image sensing unit and the display unit is included in a head mount display.

19. The system according to claim 16, wherein the virtual object is generated by computer graphics.

20. A mixed reality presentation method comprising:
- an image sensing step of sensing a real world with an image sensing unit;
- a measuring step of measuring an image sensing position of said image sensing unit;
- a virtual image obtaining step of obtaining a virtual object illuminated by light from a virtual light source;
- an adjustment step of adjusting brightness of the virtual object in a case where the image sensing position of the image sensing unit is between the position of the virtual light source and the position of the virtual object; and
- a display control step of displaying a virtual object obtained by said virtual object obtaining unit on a display unit.

21. The method according to claim 20, further comprising a calculation step of calculating an adjustment value for brightness of the virtual light source using the image sensing position, a position of the virtual light source, and a position of the virtual object,
- wherein, in the adjustment step, a brightness of the virtual object is adjusted using the adjustment value calculated in said calculation step.

* * * * *